(12) United States Patent  
Cerundolo (10) Patent No.: US 8,929,651 B2  
(45) Date of Patent: Jan. 6, 2015

(54) SYSTEM AND METHOD FOR THE REPAIR OF ANOMALIES IN IMAGES

(75) Inventor: Vince Cerundolo, Pasadena, CA (US)

(73) Assignee: Thomson Licensing, Issy les Moulineaux (FR)

( * ) Notice: Subject to any disclaimer, the term of this patent is extended or adjusted under 35 U.S.C. 154(b) by 59 days.

(21) Appl. No.: 13/885,231

(22) PCT Filed: Nov. 16, 2010

(86) PCT No.: PCT/US2010/056816  
§ 371 (c)(1),  
(2), (4) Date: May 14, 2013

(87) PCT Pub. No.: WO2012/067606  
PCT Pub. Date: May 24, 2012

(65) Prior Publication Data  
US 2013/0236096 A1    Sep. 12, 2013

(51) Int. Cl.  
*G06K 9/00* (2006.01)  
*H04N 9/64* (2006.01)  
*G03F 3/08* (2006.01)  
*G06T 5/00* (2006.01)  
*G06T 5/20* (2006.01)  
*H04N 5/367* (2011.01)  
*G06T 7/40* (2006.01)

(52) U.S. Cl.  
CPC ... *G06T 5/00* (2013.01); *G06T 5/20* (2013.01); *H04N 5/3675* (2013.01); *H04N 9/646* (2013.01); *G06T 7/408* (2013.01)  
USPC ............ 382/167; 382/103; 348/246; 358/518

(58) Field of Classification Search  
CPC ........... G06T 5/005; G06T 5/002; G06T 5/50; G06T 7/408; H04N 5/235; H04N 5/357; H04N 9/045; H04N 9/646; H05N 5/3675

USPC ......... 382/103, 167, 254, 274, 275, 312, 300; 348/222.1, 241, 246; 358/1.19, 500, 358/518, 525; 345/604  
See application file for complete search history.

(56) References Cited

U.S. PATENT DOCUMENTS

| | | | |
|---|---|---|---|
| 6,665,447 B1 | 12/2003 | Chan | |
| 7,573,508 B1 * | 8/2009 | Kondo et al. | 348/224.1 |
| 8,441,546 B2 * | 5/2013 | Higuchi | 348/222.1 |

(Continued)

FOREIGN PATENT DOCUMENTS

| EP | 2247112 | 11/2010 |
|---|---|---|
| JP | 2000115791 | 4/2000 |

OTHER PUBLICATIONS

Chen et al., "Space Variant Median Filters for the Restortation of Impulse Noise Corrupted Images", IEEE Transactions on Circuits and Systems II: Express Briefs, vol. 48, No. 8, New York, NY, Aug. 1, 2001.

(Continued)

*Primary Examiner* — Kanjibhai Patel  
(74) *Attorney, Agent, or Firm* — Robert D. Shedd; Vincent E. Duffy; Michael A. Pugel (57) ABSTRACT

The present invention concerns a method and associated apparatus for improving the quality of digital imagery by detecting and correcting erroneous pixel values from image sensors, such as those produced by stuck or dead pixels in a CCD or CMOS sensor. Anomalous pixel values are detected through comparisons with values of adjacent pixels and corrected selectively per channel through interpolation of adjacent pixel values.

51 Claims, 5 Drawing Sheets

(56) References Cited

U.S. PATENT DOCUMENTS

| | | | |
|---|---|---|---|
| 8,472,712 B2* | 6/2013 | Cote et al. | 382/167 |
| 2008/0170248 A1 | 7/2008 | Kang et al. | |
| 2009/0251570 A1 | 10/2009 | Shi | |
| 2009/0263017 A1 | 10/2009 | Tanbakuchi | |
| 2010/0091194 A1 | 4/2010 | Lei et al. | |

OTHER PUBLICATIONS

Funt, et al., "Non-von-Kries 3-Parameter Color Prediction" Medical Imaging 2012: Image Perception Observer Performance and Technology Assessment.

International Search report dated Jul. 28, 2011.

\* cited by examiner

SYSTEM AND METHOD FOR THE REPAIR OF ANOMALIES IN IMAGES

This application claims the benefit, under 35 U.S.C §365 of International Application PCT/US2010/056816, filed Nov. 16, 2010, which was published in Accordance with PCT Article 21(2) on May 24, 2012 in English.

FIELD OF THE INVENTION

The present invention generally relates to a method and associated apparatus for improving the quality of digital imagery by detecting and correcting erroneous pixel values from image sensors, such as those produced by stuck or dead pixels in a CCD or CMOS sensor. Anomalous pixel values are detected through comparisons with values of adjacent pixels and corrected selectively per channel through interpolation of adjacent pixel values.

BACKGROUND OF THE INVENTION

This section is intended to introduce the reader to various aspects of art, which may be related to various aspects of the present invention that are described below. This discussion is believed to be helpful in providing the reader with background information to facilitate a better understanding of the various aspects of the present invention. Accordingly, it should be understood that these statements are to be read in this light, and not as admissions of prior art.

Still images and digital video are generally captured using sensor arrays. These arrays contain large numbers of light sensitive elements and corresponding electronics to produce digital values indicative of the amount of received light at each location on the array. In a CCD sensor, each sensor holds a charge, which is converted to a voltage, which is then converted to a digital value in a digital imaging system.

In most systems for still image and video capture, color filters are used to make individual sensors in the array sensitive to certain ranges of wavelengths of light. The most common sensors use filters to allow separate detection of light in the red, green, and blue portions of the visible spectrum. Digital values from groups of nearby sensors filtered for red, green, and blue light are generally used directly or interpolated to produce each RGB pixel value of an output image.

If a particular sensor in an array is defective, one or more of the red, green, or blue values for a pixel may be erroneous. In some cases, a sensor may be described as "dead," and produce a minimum output regardless of the amount of incident light. In other cases, the sensor may be described as "stuck," producing the maximum output regardless of the amount of incident light. Physical obstructions such as dust particles on the sensor may also cause suboptimal image data.

Pixel values from such defective sensors may differ significantly from those of neighboring pixels and produce a visible, objectionable defect in the image. It can therefore be desirable to apply image processing to detect pixel data produced by faulty sensors and substitute values based upon information from surrounding pixels to reduce the impact of the defect. The invention described herein addresses these and/or other problems.

SUMMARY OF THE INVENTION

In order to solve the problems described above, the present disclosure is directed towards a method and associated apparatus for improving the quality of digital imagery by detecting and correcting erroneous pixel values from image sensors, such as those produced by stuck or dead pixels in a CCD or CMOS sensor. Anomalous pixel values are detected through comparisons with values of adjacent pixels and corrected selectively per channel through interpolation of adjacent pixel values. This and other aspects of the invention will be described in detail with reference to the accompanying drawings.

BRIEF DESCRIPTION OF THE DRAWINGS

The above-mentioned and other features and advantages of this invention, and the manner of attaining them, will become more apparent, and the invention will be better understood, by reference to the following description of embodiments of the invention taken in conjunction with the accompanying drawings, wherein.

The exemplifications set out herein illustrate preferred embodiments of the invention, and such exemplifications are not to be construed as limiting the scope of the invention in any manner.

DETAILED DESCRIPTION

As described herein, the present invention provides a method and associated apparatus for improving the quality of digital imagery by detecting and correcting erroneous pixel values from image sensors, such as those produced by stuck or dead pixels in a CCD or CMOS sensor. Anomalous pixel values are detected through comparisons with values of adjacent pixels and corrected selectively per channel through interpolation of adjacent pixel values.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The present invention may be implemented in image processing hardware or software within a video production environment. The algorithms may be applied in an independent software program or in a plug-in module to an existing image or video processing application. In a preferred embodiment, the algorithms are implemented as a plug-in using the "openFX" API. While the invention is described with regard to defects arising from faulty image sensors, the technique may also be effective in correcting defects introduced by certain image processing operations. Furthermore, the invention may also be implemented within image capture devices to correct defects as they develop in the system, or to allow the use of defective sensors in products to increase manufacturing yields.

Figure 1:
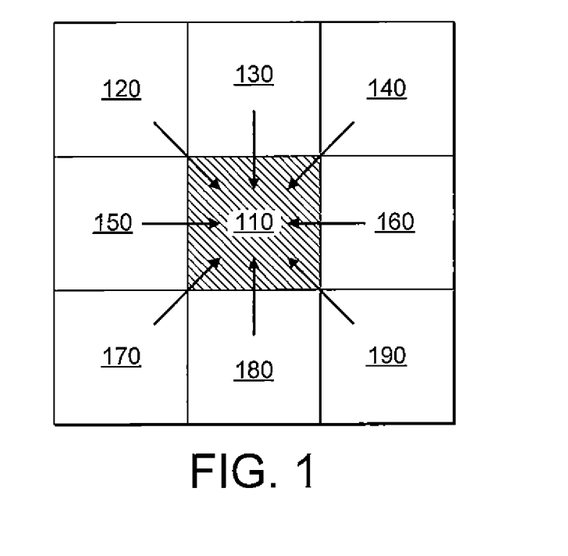
FIG. 1 is an illustration of a pixel and its surrounding pixels.

FIG. 1 is illustration of a pixel 110 and its surrounding pixels 120-190. If the color values of pixel 110 are determined to be anomalous by the present method, the values of pixel 110 may be selectively replaced with a weighted average of the values of the surrounding pixels. It will be recognized by one skilled in the art that greater or smaller numbers of nearby pixels may be used in the calculation of new values for pixel 110.

The weight used to determine the contribution of each nearby pixel to the new values of pixel 110 may be preferably based upon the distance of the center of each pixel from the center of pixel 110. For instance, the inverse of the distance, or the inverse of the square of the distance may be used to scale the weight of each pixel. The sum of the weights of adjacent pixels is preferably chosen to be 1.0. In a preferred embodiment, a weighting value of 0.15 is used for vertically and horizontally adjacent pixels 130, 150, 160, and 180, and a weighting value of 0.10 is used for diagonally adjacent pixels 120, 140, 170, and 190.

Figure 2:
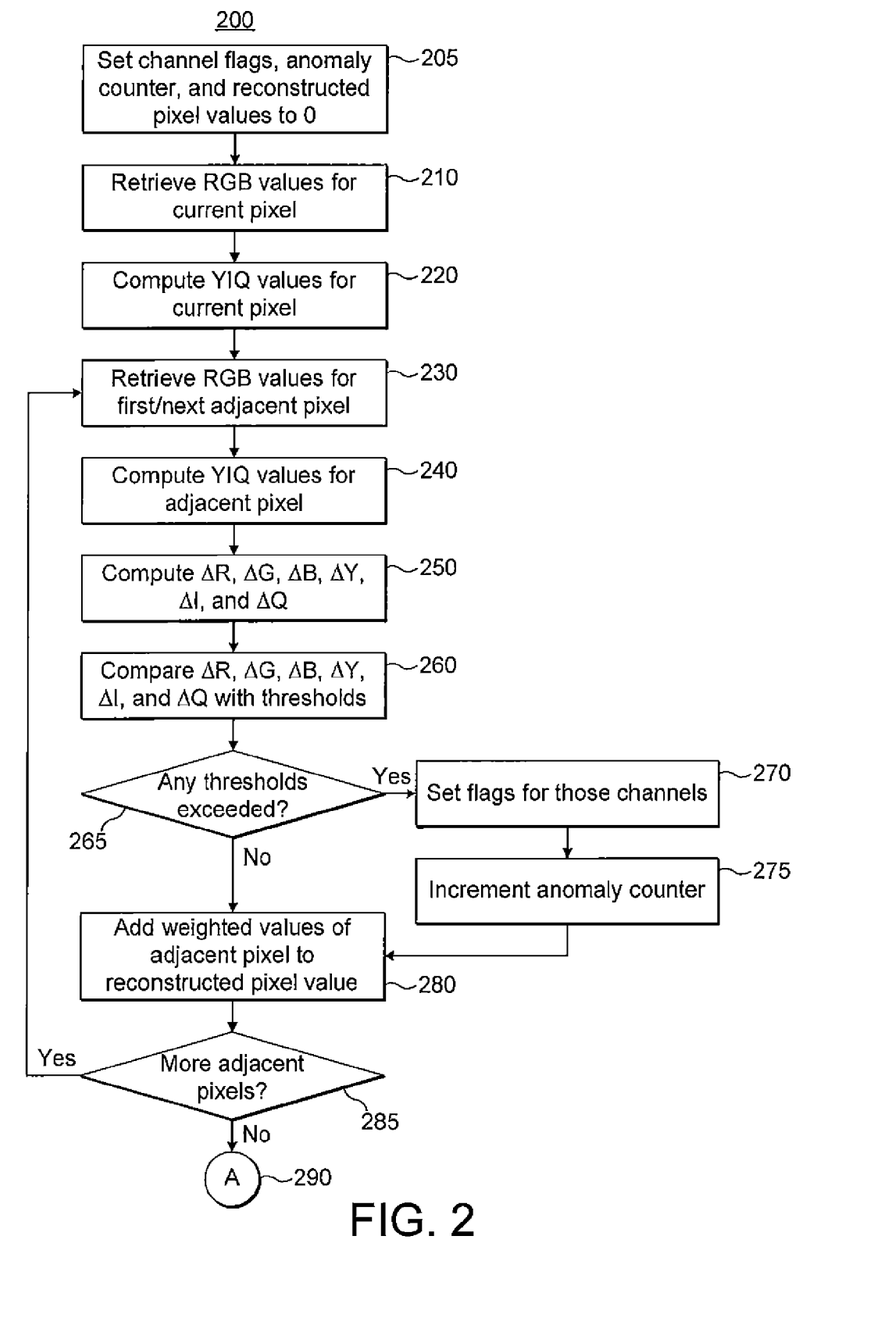
FIG. 2 is a flow chart of a process for detecting an anomalous pixel in an image.

FIG. 2 is a flowchart of a process 200 for determining whether a particular pixel is anomalous. The process is repeated for each pixel within the region of interest of the image. At step 205, binary flags for each color channel, an anomaly counter for the current pixel, and set of potential reconstructed pixel values are set to zero.

At step 210, pixel values for the current pixel are retrieved. In a preferred embodiment, a triad of values representing red, green, and blue channels represents each pixel of the image.

At step 220, the red, green, and blue values for the current pixel are converted into luminance and chrominance values, Y, I, and Q. In a preferred embodiment, the conversion defined by Society of Motion Picture and Television Engineers (SMTPE) standard 170M may be used. The luminance is then computed as:

$$Y = +5.87 \times green + 1.14 \times blue + 2.99 \times red$$

The chrominance values are computed as:

$$I = -2.746 \times green - 3.213 \times blue + 5.959 \times red$$

$$Q = -5.227 \times green + 3.112 \times blue + 2.115 \times red$$

At step 230, the pixel values for one of the pixels adjacent to the current pixel are retrieved. At step 240, these values are also converted to the YIQ color space. This step and the subsequent steps of process 200 will be repeated for each of the adjacent pixels.

Those skilled in the art will recognize that other color spaces may be used to represent the image or used as the color space for color difference calculations. For instance, the RGB color space may be encoded with respect to various primary values and at various bit depths. The CIELAB or CIELUV color spaces may be used in place of SMPTE 170M YIQ. Furthermore, to avoid redundant computation, since each pixel will generally be an adjacent pixel for eight other pixels, all of the pixels of the image may be converted to a second color space before the analysis of differences begins.

At step 250, the differences between the pixel values for each RGB color channel and each luminance and chrominance component are computed between the current pixel and the adjacent pixel. In a preferred embodiment, the difference is computed as the absolute value of the subtractive difference between the values for a particular channel. At step 260, the computed difference for each channel is compared against a threshold difference value for that color channel.

At step 265, a determination is made as to whether any of the thresholds for difference in any of the color channels in either color space representation, RGB or YIQ, has been exceeded for the current pixel. It will be recognized by one skilled in the art that more or fewer color channels may be included in the test. Furthermore, more advanced color difference equations may be employed.

If any difference thresholds have been exceeded, a flag is set for each of those color dimensions at step 270. For instance, if the difference in the red values between the center pixel and the currently assessed adjacent pixel exceeds the threshold set for the red color difference, a flag is set for the red channel.

Also, at step 275, if any of the difference thresholds have been exceeded, an anomaly counter is incremented by 1. After all of the adjacent pixels have been analyzed, the anomaly counter will provide an indication of the total number of adjacent pixels for which at least one color difference threshold was exceeded.

At step 280, the weighted pixel values of the currently analyzed adjacent pixel are added to a running total of weighted pixel values. The sum is initialized to zero at step 205 for each center pixel to be analyzed. As described with respect FIG. 1, the sum of the weights of the surrounding pixels will generally be 1.0. In the described embodiment, the potential corrected pixel values are calculated as the adjacent pixels are assessed, and a decision as to whether to use the corrected value for each channel is made at a later step, described below with regard to FIG. 3. In some embodiments, the calculation of the weighted sums may be performed conditionally only after the pixel is determined to be anomalous.

At step 285, a determination is made as to whether additional adjacent pixels need to be assessed. If the eight surrounding pixels are considered in the determination of an anomalous pixel, as shown in FIG. 1, the process of steps 230-285 will be repeated eight times. It will be recognized by one skilled in the art that more or fewer pixels may be considered in the analysis process and the reconstruction process for pixels determined to be anomalous. If no, further adjacent pixels are to be analyzed, the process continues to step 290 and the process for selecting the pixel value to be used in the output image.

Figure 3:
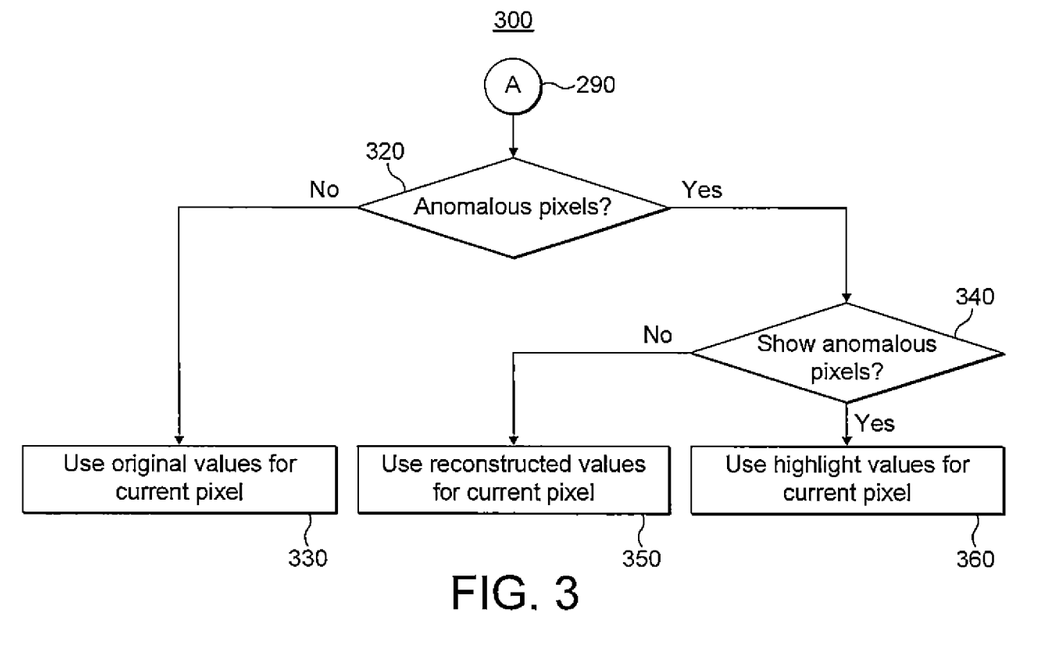
FIG. 3 is a flowchart of a process for selecting the pixel values to be used for a pixel in an output image.

FIG. 3 is a flowchart of a process 300 for selecting the pixel values to be used for the current pixel in the output image. A test is performed at step 320 to determine whether the current pixel is anomalous. As described above, after each adjacent pixel has been analyzed by process 200, the anomaly counter will indicate the number of adjacent pixels for which at least one difference threshold was exceeded. In a preferred embodiment, the pixel will be considered anomalous if the anomaly counter exceeds a predetermined value. For instance, in a preferred embodiment where eight adjacent pixels are assessed, an anomaly counter threshold value, of five would indicate that at least six adjacent pixels would need to have a color difference exceeding a specified threshold for the current pixel to be considered anomalous.

If the pixel is not anomalous, it is drawn, rendered, or passed to subsequent processing using its original values at step 330. If the pixel is deemed to be anomalous, a further decision is made at step 340 to determine whether the system is configured such that anomalous pixels should be corrected or simply highlighted.

If the system has been configured to correct anomalous pixels, the correction is performed at step 350. The correction may be performed for all color channels simultaneously, or for fewer than all of the channels if the anomaly is isolated to one channel. In a preferred embodiment, if one of the detected above-threshold color differences was for luminance (Y) or chrominance (I or Q), all three color channels, red, green, and blue, would be corrected. If differences above threshold were only detected in the green channel and luminance and chrominance differences were all below their respective thresholds, only the green channel would be corrected.

If the system is set to highlight anomalies rather than correct them, the pixel is highlighted at step 360. Highlighting may be performed using a variety of processes. The values of anomalous pixels may be changed to a bright red or bright green, or anomalous pixels may be identified by modifying the values of a mask layer, which may be used at subsequent steps to allow visual identification of anomalous areas.

It will be recognized by one skilled in the art that replacement of particular pixels by reconstructed values or by highlight color values may be deferred until after all pixels in the image have been analyzed. Furthermore, in some embodiments, both highlighting and correction may be performed on the same image.

Figure 4:
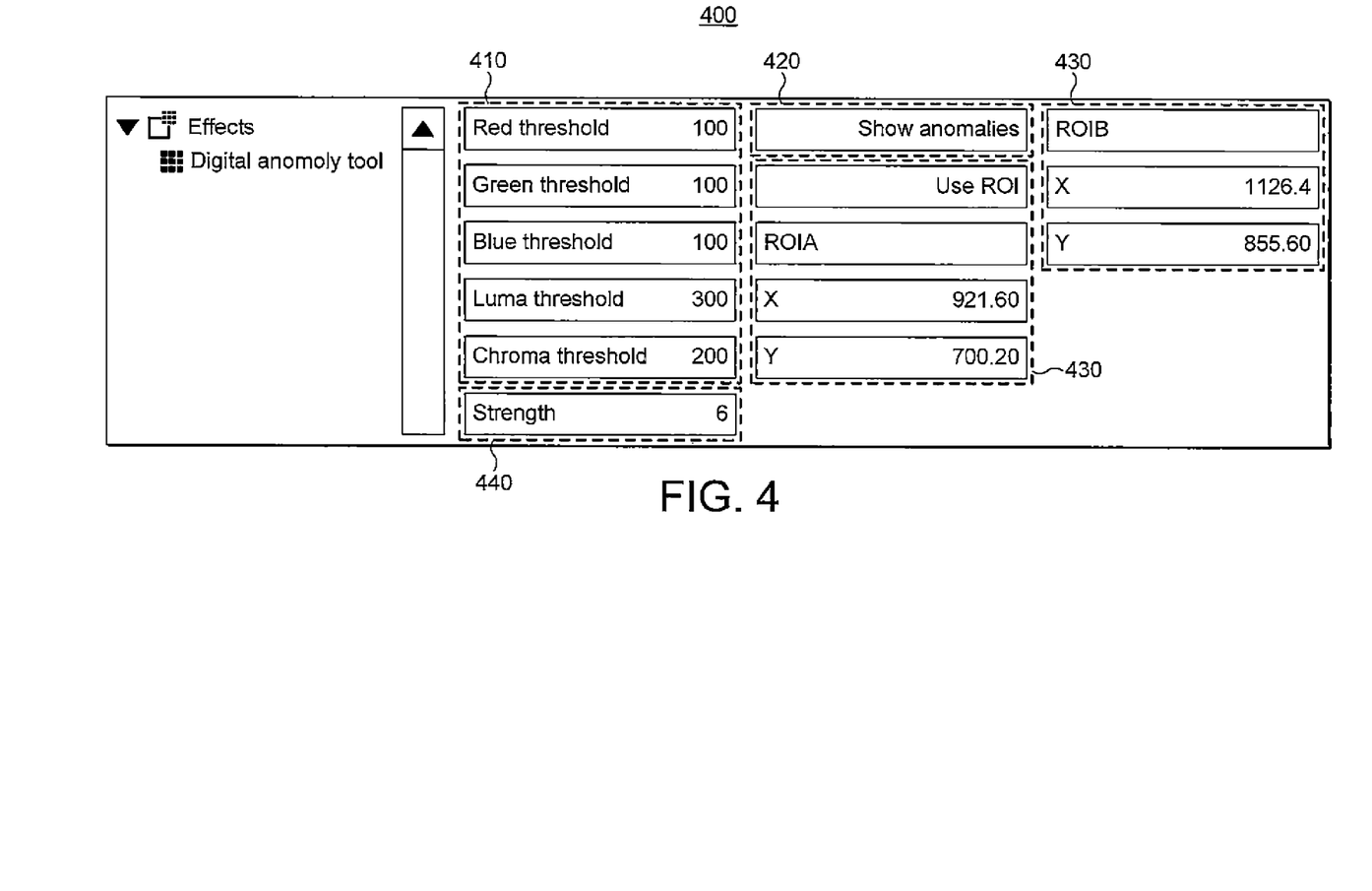
FIG. 4 is an illustration of a user interface for a software application implementing the image repair process.

FIG. 4 is an illustration of a user interface 400 for a software application implementing the image repair process. The user interface may be presented by a dedicated software program implementing the method, or by a separate application if the method is implemented as a plug-in.

In a preferred embodiment, the user is provided with dialog boxes 410 for setting the difference thresholds for each color channel, in both RGB and YIQ color spaces, which are assessed in steps 260 and 265 described above. In this particular embodiment, a single threshold is used for both the I and Q chrominance channels. In a preferred embodiment operating on 10-bit imagery, the threshold values would be adjustable in a range of 0 to 1023.

A control 420 is provided to allow the user to select whether anomalous pixels are highlighted in a display of the analyzed image. The state of this selection would be used at step 340, described above, to determine whether the original pixel values are to be replaced with corrected values or highlight values. In a preferred embodiment, if a pixel is flagged as having an anomaly in the red channel, for instance, the pixel on the resulting image will be modified to a bright red, allowing the user to easily see the location and extent of the detected anomalies.

The user is also provided with dialog boxes 430 for defining the bounds of a region of interest (ROI) within the image to which the correction or highlighting processes are applied, as well as a control for whether the ROI will be used. The ROI may be used to limit the processing to a particular area of a composite image that was generated by a sensor, or to restrict the operation of the processing to a smaller region known to contain anomalies in order to reduce processing time.

Additional parameters, such as a strength value 440, may be set by the user to control the operation of the algorithms. The strength value may, for instance, control the number of adjacent pixels for which at least one threshold must be exceeded before correction of the center pixel is performed.

Figure 5:
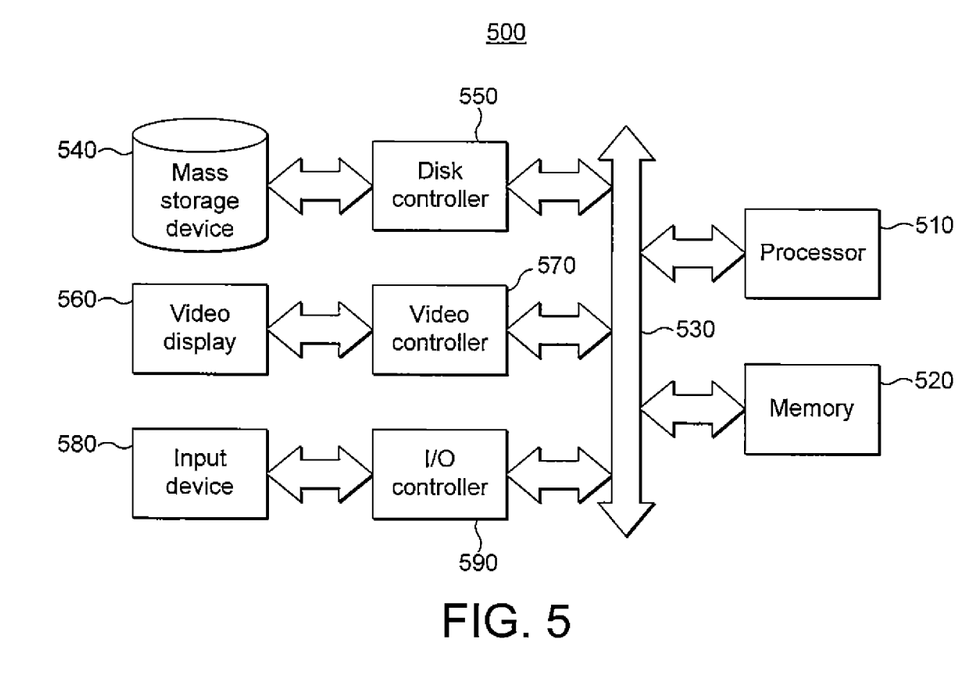
FIG. 5 is a diagram of an apparatus for implementing the image repair process.

FIG. 5 is a diagram of an exemplary apparatus 500 for implementing the image repair process. System 500 may be implemented as a general-purpose computing platform or with custom components.

The apparatus contains a processor 510 for executing the steps of the method and a memory 520 for storing program and image data. A bus 530 connects the processor 510 and memory 520 to each other and to other subsystems. In some embodiments, system 500 will contain multiple processors or processors with multiple processing cores, which may execute various steps of the method simultaneously.

A mass storage device 540 is connected to bus 530 via a disk controller 550. Mass storage device 540 may contain image or video data to be read by the image repair program, as well as an operating system, other programs, and other data. Disk controller 550 may operate according to Serial Advanced Technology Advancement (SATA), Small Computer System Interface (SCSI), or other standards, and provide connection to multiple mass storage devices.

A video display 560 is connected to the bus 530 via a video controller 570. The video controller 570 may provide its own memory and graphics-processing unit for use in implementing or accelerating certain steps of the image repair process, as well as providing the functions of image and UI display.

An input device 580 is connected to the bus via an I/O controller 590. I/O controller 590 may utilize one or more of USB, IEEE 1394a, or other standards. Multiple input devices may be connected, such as keyboards, mice, and trackpads. Video capture devices may also be connected to the system through I/O controller 590 or additional I/O controllers implementing other I/O standards. I/O controller 590 or a separate I/O controller may provide networking functions.

It will be recognized by one skilled in the art that the methods of the present invention may be executed simultaneously on multiple systems 500 to provide faster processing. For instance, in the case of processing a video file, frames may be divided amongst perhaps tens or hundreds of computing systems to provide parallel processing. Particular components, such as video display 560, may be omitted in some systems in some operating environments. Furthermore, multiple systems may utilize shared storage accessed via an I/O bus or via a network.

It will be further recognized by one skilled in the art that system 500 may be implemented within an image capture device such as a digital still camera or digital video camera. The image repair process may be implemented by system 500 at the time of image capture to correct sensor defects or image defects from dust or other obstructions. Furthermore, the image repair method may be applied selectively to correct defects in sensors present at the time of manufacture, allowing higher manufacturing yield by allowing use of sensors with defective pixels in products.

While the present invention has been described in terms of a specific embodiment, it will be appreciated that modifications may be made which will fall within the scope of the invention. For example, various processing steps may be implemented separately or combined, and may be implemented in general purpose or dedicated data processing hardware or in software, and thresholds and other parameters may be adjusted to suit varying types of video input.

What is claimed is:

1. A method for processing an image containing a plurality of pixels, the method comprising:
    selecting one of the plurality of pixels;
    obtaining color values for said selected pixel, said color values representing values in a first color space;
    converting said color values for said selected pixel to color values for said selected pixel in a second color space;
    obtaining color values for a plurality of pixels in a vicinity of said selected pixel, said color values representing values in said first color space;
    converting said color values for said plurality of pixels in the vicinity of said selected pixel to color values for said plurality of pixels in said second color space;
    determining a plurality of differences between the color values of the selected pixel and the color values of each pixel of said plurality of pixels in the vicinity of said selected pixel;
    comparing each of said plurality of differences with one of a plurality of predetermined thresholds; and
    responsive to a determination that a number of pixels in the vicinity of said selected pixel for which at least one of said plurality of differences was above a predetermined threshold is above a predetermined anomaly threshold, setting a new color value for at least one color channel of said selected pixel to a highlight color value.

2. The method of claim 1 wherein the values of each pixel in a second color space are computed using at least the color values of the same pixel represented in a first color space.

3. The method of claim 1 wherein said first color space is an RGB color space.

4. The method of claim 1 wherein said second color space is a YIQ color space.

5. The method of claim 1 wherein said step of comparing each of said plurality of differences with a predetermined threshold comprises comparing the color difference for each channel of each color space with a threshold specific to that color channel.

6. The method of claim 1 wherein said differences are computed as the absolute value of the difference in color value for each color channel of each color space.

7. The method of claim 1 wherein said plurality of pixels in the vicinity of said selected pixel comprises eight horizontally, vertically, and diagonally adjacent pixels.

8. The method of claim 1 further comprising the step of setting a value in a mask layer to indicate that the selected pixel is anomalous.

9. An apparatus for detecting and enhancing a moving object in a video sequence comprising:
   means for selecting one of the plurality of pixels;
   means for obtaining color values for said selected pixel, said color values representing values in a first color space;
   means for converting said color values for said selected pixel to color values for said selected pixel in a second color space;
   means for obtaining color values for a plurality of pixels in a vicinity of said selected pixel, said color values representing values in said first color space;
   means for converting said color values for said plurality of pixels in the vicinity of said selected pixel to color values for said plurality of pixels in said second color space;
   means for determining a plurality of differences between the color values of the selected pixel and the color values of each pixel of said plurality of pixels in the vicinity of said selected pixel;
   means for comparing each of said plurality of differences with one of a plurality of predetermined thresholds; and
   means for, responsive to a determination that a number of pixels in the vicinity of said selected pixel for which at least one of said plurality of differences was above a predetermined threshold is above a predetermined anomaly threshold, setting a new color value for at least one color channel of said selected pixel to a highlight color value.

10. The apparatus of claim 9 wherein said means for comparing each of said plurality of differences with a predetermined threshold comprises means for comparing the color difference for each channel of each color space with a threshold specific to that color channel.

11. The apparatus of claim 9 wherein said first color space is an RGB color space.

12. The apparatus of claim 9 wherein the values of each pixel in a second color space are computed using at least the color values of the same pixel represented in a first color space.

13. The apparatus of claim 9 wherein said second color space is a YIQ color space.

14. The apparatus of claim 9 wherein said differences are computed as the absolute value of the difference in color value for each color channel of each color space.

15. The apparatus of claim 9 wherein said plurality of pixels in the vicinity of said selected pixel comprises eight horizontally, vertically, and diagonally adjacent pixels.

16. The apparatus of claim 9 further comprising means for setting a value in a mask layer to indicate that the selected pixel is anomalous.

17. An apparatus comprising:
   a memory for storing a plurality of pixel values of a digital image; and a processor for:
   selecting one of the plurality of pixels;
   obtaining color values for said selected pixel, said color values representing values in a first color space;
   converting said color values for said selected pixel to color values for said selected pixel in a second color space;
   obtaining color values for a plurality of pixels in the vicinity of said selected pixel, said color values representing values in said first color space;
   converting said color values for said plurality of pixels in the vicinity of said selected pixel to color values for said plurality of pixels in said second color space;
   determining a plurality of differences between the color values of the selected pixel and the color values of each pixel of said plurality of pixels in the vicinity of said selected pixel;
   comparing each of said plurality of differences with one of a plurality of predetermined thresholds; and
   responsive to a determination that the number of pixels in the vicinity of said selected pixel for which at least one of said plurality of differences was above a predetermined threshold is above a predetermined anomaly threshold, setting a new color value for at least one color channel of said selected pixel to a highlight color value.

18. The apparatus of claim 17 wherein said first color space is an RGB color space.

19. The apparatus of claim 17 wherein comparing each of said plurality of differences with a predetermined threshold comprises comparing the color difference for each channel of each color space with a threshold specific to that color channel.

20. The apparatus of claim 17 wherein said second color space is an YIQ color space.

21. The apparatus of claim 17 wherein the values of each pixel in a second color space are computed using at least the color values of the same pixel represented in a first color space.

22. The apparatus of claim 17 wherein said differences are computed as the absolute value of the difference in color value for each color channel of each color space.

23. The apparatus of claim 17 wherein said plurality of pixels in the vicinity of said selected pixel comprises eight horizontally, vertically, and diagonally adjacent pixels.

24. The apparatus of claim 17 wherein the processor is further configured for setting a value in a mask layer to indicate that the selected pixel is anomalous.

25. A method for processing an image containing a plurality of pixels, the method comprising:
   selecting one of the plurality of pixels;
   obtaining color values for said selected pixel, said color values representing values in a first color space;
   converting said color values for said selected pixel to color values for said selected pixel in a second color space;
   obtaining color values for a plurality of pixels in a vicinity of said selected pixel, said color values representing values in said first color space;

converting said color values for said plurality of pixels in the vicinity of said selected pixel to color values for said plurality of pixels in said second color space;

determining a plurality of differences between the color values of the selected pixel and the color values of each pixel of said plurality of pixels in the vicinity of said selected pixel;

comparing each of said plurality of differences with one of a plurality of predetermined thresholds;

responsive to a determination that a number of pixels in the vicinity of said selected pixel for which at least one of said plurality of differences was above a predetermined threshold is above a predetermined anomaly threshold, determining a new color value for at least one color channel of said selected pixel; and setting a value in a mask layer to indicate that the selected pixel is anomalous.

26. The method of claim 25 wherein said determining a new color value comprises computing a weighted average of the color values of surrounding pixels.

27. The method of claim 25 wherein the values of each pixel in a second color space are computed using at least the color values of the same pixel represented in a first color space.

28. The method of claim 25 wherein said first color space is an RGB color space.

29. The method of claim 25 wherein said second color space is a YIQ color space.

30. The method of claim 25 wherein said step of comparing each of said plurality of differences with a predetermined threshold comprises comparing the color difference for each channel of each color space with a threshold specific to that color channel.

31. The method of claim 25 wherein said differences are computed as the absolute value of the difference in color value for each color channel of each color space.

32. The method of claim 25 wherein said plurality of pixels in the vicinity of said selected pixel comprises eight horizontally, vertically, and diagonally adjacent pixels.

33. The method of claim 25 wherein said step of determining a new color value for at least one color channel of said selected pixel comprises setting the color values to a highlight color.

34. An apparatus for detecting and enhancing a moving object in a video sequence comprising:
    means for selecting one of the plurality of pixels;
    means for obtaining color values for said selected pixel, said color values representing values in a first color space;
    means for converting said color values for said selected pixel to color values for said selected pixel in a second color space;
    means for obtaining color values for a plurality of pixels in a vicinity of said selected pixel, said color values representing values in said first color space;
    means for converting said color values for said plurality of pixels in the vicinity of said selected pixel to color values for said plurality of pixels in said second color space;
    means for determining a plurality of differences between the color values of the selected pixel and the color values of each pixel of said plurality of pixels in the vicinity of said selected pixel;
    means for comparing each of said plurality of differences with one of a plurality of predetermined thresholds;
    means for, responsive to a determination that a number of pixels in the vicinity of said selected pixel for which at least one of said plurality of differences was above a predetermined threshold is above a predetermined anomaly threshold, determining a new color value for at least one color channel of said selected pixel; and
    means for setting a value in a mask layer to indicate that the selected pixel is anomalous.

35. The apparatus of claim 34 wherein said means for determining a new color value comprises computing a weighted average of the color values of surrounding pixels.

36. The apparatus of claim 34 wherein the values of each pixel in a second color space are computed using at least the color values of the same pixel represented in a first color space.

37. The apparatus of claim 34 wherein said first color space is an RGB color space.

38. The apparatus of claim 34 wherein said second color space is a YIQ color space.

39. The apparatus of claim 34 wherein said means for comparing each of said plurality of differences with a predetermined threshold comprises means for comparing the color difference for each channel of each color space with a threshold specific to that color channel.

40. The apparatus of claim 34 wherein said differences are computed as the absolute value of the difference in color value for each color channel of each color space.

41. The apparatus of claim 34 wherein said plurality of pixels in the vicinity of said selected pixel comprises eight horizontally, vertically, and diagonally adjacent pixels.

42. The apparatus of claim 34 wherein said means for determining a new color value for at least one color channel of said selected pixel comprises means for setting the color values to a highlight color.

43. An apparatus comprising:
    a memory for storing a plurality of pixel values of a digital image; and
    a processor for:
    selecting one of the plurality of pixels;
    obtaining color values for said selected pixel, said color values representing values in a first color space;
    converting said color values for said selected pixel to color values for said selected pixel in a second color space;
    obtaining color values for a plurality of pixels in the vicinity of said selected pixel, said color values representing values in said first color space;
    converting said color values for said plurality of pixels in the vicinity of said selected pixel to color values for said plurality of pixels in said second color space;
    determining a plurality of differences between the color values of the selected pixel and the color values of each pixel of said plurality of pixels in the vicinity of said selected pixel;
    comparing each of said plurality of differences with one of a plurality of predetermined thresholds; and
    responsive to a determination that the number of pixels in the vicinity of said selected pixel for which at least one of said plurality of differences was above a predetermined threshold is above a predetermined anomaly threshold, determining a new color value for at least one color channel of said selected pixel; and
    setting a value in a mask layer to indicate that the selected pixel is anomalous.

44. The apparatus of claim 43 wherein said determining a new color value comprises computing a weighted average of the color values of surrounding pixels.

45. The apparatus of claim 43 wherein the values of each pixel in a second color space are computed using at least the color values of the same pixel represented in a first color space.

46. The apparatus of claim 43 wherein said first color space is an RGB color space.

47. The apparatus of claim 43 wherein said second color space is a YIQ color space.

48. The apparatus of claim 43 wherein said comparing each of said plurality of differences with a predetermined threshold comprises comparing the color difference for each channel of each color space with a threshold specific to that color channel.

49. The apparatus of claim 43 wherein said differences are computed as the absolute value of the difference in color value for each color channel of each color space.

50. The apparatus of claim 43 wherein said plurality of pixels in the vicinity of said selected pixel comprises eight horizontally, vertically, and diagonally adjacent pixels.

51. The apparatus of claim 43 wherein said determining a new color value for at least one color channel of said selected pixel comprises means for setting the color values to a highlight color.

\* \* \* \* \*